(12) United States Patent
Olaru

(10) Patent No.: US 9,381,692 B2
(45) Date of Patent: Jul. 5, 2016

(54) APPARATUS AND METHOD FOR INJECTION MOLDING AND COOLING PET PREFORMS

(71) Applicant: Otto Manner Innovation GMBH, Bahlingen (DE)

(72) Inventor: Gheorghe George Olaru, Freiburg (DE)

(73) Assignee: Otto Männer Innovation GmbH, Bahlingen (DE)

( * ) Notice: Subject to any disclaimer, the term of this patent is extended or adjusted under 35 U.S.C. 154(b) by 166 days.

(21) Appl. No.: 14/195,852

(22) Filed: Mar. 3, 2014

(65) Prior Publication Data

US 2014/0319732 A1 Oct. 30, 2014

Related U.S. Application Data

(60) Provisional application No. 61/771,786, filed on Mar. 1, 2013.

(51) Int. Cl.
| | |
|---|---|
| *B29C 45/72* | (2006.01) |
| *B29C 45/64* | (2006.01) |
| *B29C 45/40* | (2006.01) |
| *B29C 45/73* | (2006.01) |
| *B29K 105/00* | (2006.01) |
| *B29C 45/16* | (2006.01) |
| *B29C 45/04* | (2006.01) |

(52) U.S. Cl.
CPC ............ *B29C 45/7207* (2013.01); *B29C 45/64* (2013.01); *B29C 45/045* (2013.01); *B29C 45/1625* (2013.01); *B29C 45/1628* (2013.01); *B29C 45/40* (2013.01); *B29C 45/73* (2013.01); *B29C 2045/1626* (2013.01); *B29C 2045/7264* (2013.01); *B29K 2105/258* (2013.01); *B29K 2995/0041* (2013.01)

(58) Field of Classification Search
CPC .............. B29C 45/045; B29C 45/7207; B29C 2045/7228; B29C 2045/7264
USPC .................................................. 425/526, 540
See application file for complete search history.

(56) References Cited

U.S. PATENT DOCUMENTS

| | | |
|---|---|---|
| 3,224,043 A | 12/1965 | Lameris et al. |
| 3,616,491 A | 11/1971 | Vollers |

(Continued)

FOREIGN PATENT DOCUMENTS

| | | |
|---|---|---|
| EP | 1782936 | 3/2009 |
| JP | 55-95544 | 7/1980 |

(Continued)

*Primary Examiner* — Alison L Hindenlang
*Assistant Examiner* — Mohamed K Ahmed Ali
(74) *Attorney, Agent, or Firm* — McAndrews Held & Malloy, Ltd.

(57) ABSTRACT

In an aspect, an injection molding machine is provided and incorporates a mold block with a plurality of sides including an injection side at which hollow parts are formed in mold cavities, a first post-mold cooling side whereat the hollow parts are cooled, and a part transfer side where parts are transferred out of the mold block. Optionally additional post-mold cooling sides are provided. A takeout structure is provided to remove the hollow parts from molding cores on the injection side, to transfer the hollow parts to the first post-mold cooling side, and to subsequently transfer the hollow parts to the part transfer side. The takeout structure holds the hollow parts by their neck portions and cools their neck portions.

2 Claims, 25 Drawing Sheets

(56) References Cited

U.S. PATENT DOCUMENTS

| | | |
|---|---|---|
| 3,850,562 A | 11/1974 | Takeuchi et al. |
| 3,878,282 A | 4/1975 | Bonis et al. |
| 4,233,021 A | 11/1980 | Spurr |
| 4,427,359 A | 1/1984 | Fukuoka et al. |
| 4,439,133 A | 3/1984 | Rees et al. |
| 4,449,913 A | 5/1984 | Krishnakumar et al. |
| 4,786,455 A | 11/1988 | Krishnakumar et al. |
| 4,830,811 A | 5/1989 | Aoki |
| 4,836,767 A | 6/1989 | Schad et al. |
| 5,080,574 A | 1/1992 | Koga et al. |
| 5,403,177 A | 4/1995 | Priest |
| 5,830,404 A | 11/1998 | Schad et al. |
| 6,095,788 A | 8/2000 | van Manen et al. |
| 6,143,225 A | 11/2000 | Domodossola et al. |
| 6,146,134 A | 11/2000 | Kresak et al. |
| 6,168,416 B1 | 1/2001 | Galt |
| 6,299,431 B1 | 10/2001 | Neter |
| 6,299,804 B1 | 10/2001 | Domodossola et al. |
| 6,368,099 B1 | 4/2002 | Kresak et al. |
| 6,503,075 B1 | 1/2003 | Schad et al. |
| 6,613,262 B1 | 9/2003 | Arend |
| 6,730,260 B2 | 5/2004 | Vardin et al. |
| 6,817,855 B2 | 11/2004 | Unterlander et al. |
| 6,878,316 B1 | 4/2005 | Cochran et al. |
| 6,986,653 B2 | 1/2006 | Unterlander et al. |
| 7,052,270 B2 | 5/2006 | Unterlander et al. |
| 7,108,501 B2 | 9/2006 | Araujo et al. |
| 7,871,260 B2 | 1/2011 | Boucherie |
| 8,360,764 B2 | 1/2013 | Armbruster et al. |

FOREIGN PATENT DOCUMENTS

| | | |
|---|---|---|
| JP | 2005-329698 | 12/2005 |
| JP | 2006-35667 | 2/2006 |
| JP | 2008-80670 | 4/2008 |
| WO | 2006/077127 | 7/2006 |
| WO | 2012/037686 | 3/2012 |
| WO | 2013/067633 | 5/2013 |

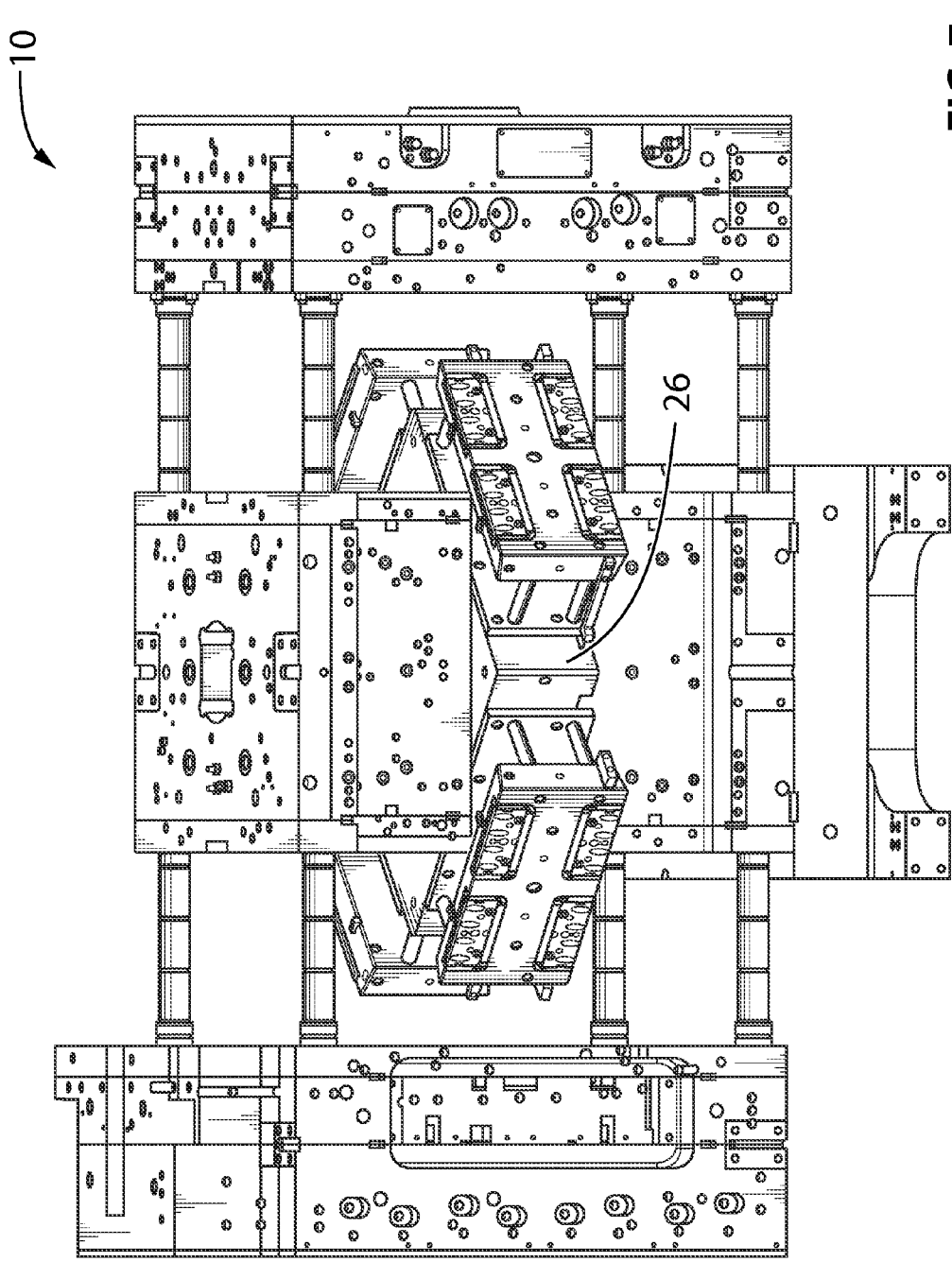

APPARATUS AND METHOD FOR INJECTION MOLDING AND COOLING PET PREFORMS

CROSS-REFERENCE TO RELATED APPLICATIONS

This application claims the benefit of priority to U.S. Provisional Patent Application No. 61/771,786 filed Mar. 1, 2013, the contents of which are incorporated herein in their entirety, and claims the benefit of priority to German Patent Application No. 10 2013 004 408.1 filed Mar. 15, 2013, the contents of which are incorporated herein in their entirety.

FIELD

The present disclosure relates to injection molding machines for molding and cooling hollow parts having a threaded neck portion. More specifically this invention is related to an injection molding machine, a mold and a preform handling mechanism for improved cooling of the hollow parts after injection molding. Also the invention relates to methods of injection molding and cooling of hollow parts such as molded preforms.

BACKGROUND

It is known in the art of molding plastic bottle preforms that it is important to cool the molded preforms as quickly as possible. Some proposed machines for the molding of preforms incorporate a large translated and rotary mold cube containing a set of injection mold cores on several faces.

There are some practical limits associated with such machines. One problem is that such machines consume a significant amount of energy to rotate the mold cube because it is very heavy. Additionally, the weight of the mold cube has a negative impact on the length of the injection cycles since more time is needed to translate and rotate a heavy mold cube than would be needed for a lighter structure.

Another problem is that such machines have injection mold cores on each face that are relatively expensive since they form part of the mold cavities and thus are manufactured within strict specifications.

Furthermore, the injection mold cores on each rotating face of the mold cube have to be perfectly aligned with respect to the stationary injection molding cavities coupled to the machine stationary platen.

Also there is a need to provide water cooling on each set of injection molding cores that rotate and the water piping of rotary cores provides a technical challenge that increases the complexity and the cost of such cube molds.

There is a need to provide solution that solves that accomplishes one or more of the following: it provides improved and faster cooling of the preforms, it consumes less energy, and it is less expensive. There is also a need to improve the cooling of the neck finish of the preforms. There is also a need to reduce the footprint of the machine and to better integrate the cooling steps with the injection molding steps.

SUMMARY

In an aspect, an injection molding machine is provided and incorporates a mold block with a plurality of sides including an injection side at which hollow parts are formed in mold cavities, a first post-mold cooling side whereat the hollow parts are cooled, and a part transfer side where parts are transferred out of the mold block. Optionally additional post-mold cooling sides are provided. A takeout structure is provided to remove the hollow parts from molding cores on the injection side, to transfer the hollow parts to the first post-mold cooling side, and to subsequently transfer the hollow parts to the part transfer side. The takeout structure holds the hollow parts by their neck portions and cools their neck portions.

BRIEF DESCRIPTION OF THE DRAWINGS

The foregoing and other aspects of the disclosure will be more readily appreciated by reference to the accompanying drawings, wherein.

DETAILED DESCRIPTION OF EXAMPLE EMBODIMENTS

Figure 1:
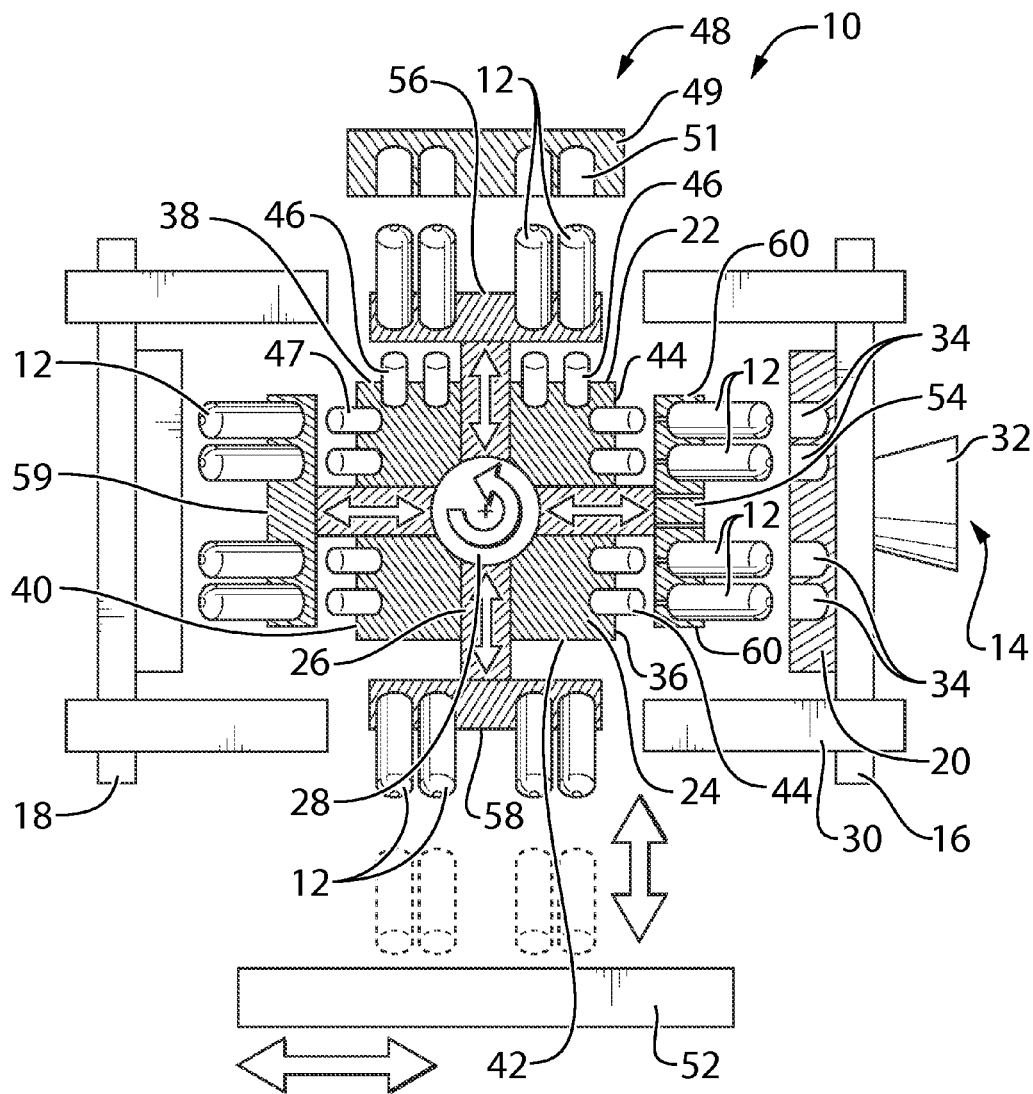
FIG. 1 shows a schematic illustration of an injection molding machine in accordance with an embodiment of the present invention.

In an embodiment, an injection molding machine, an injection mold and a method of injection molding and cooling are provided for PET or other type of resins preforms for subsequent blow molding operations, or for other hollow parts.

The hollow parts are first molded in a matrix of injection mold cavities that include neck ring cavity portions. The injection mold cores that define the mold cavity space are located on a movable/translating multi-facet mold block. After the preforms injection molded are cooled in the mold, a first stripper plate including neck ring cavity portions is activated to fully remove and disengage the preforms from the injection mold cores. The molded preforms are retained and cooled by the neck ring cavity portions are defined by a mold cavity portion, Reference is made to FIG. 1, which shows an injection molding machine 10 for molding and cooling plastic bottle preforms, shown at 12. The plastic bottle preforms 12 are but an example of hollow parts that can be molded using the injection molding machine 10. It will be understood that, while terms such as preforms or PET preforms or the like may be used in this disclosure, it is to only for convenience and for the purpose of illustrating one example, and that any suitable hollow part may alternatively be molded. In general a hollow part refers to a part that is hollow and may have a blind end, as PET preforms do, although a blind end is not strictly necessary.

The injection molding machine 10 includes an injection unit 14, a first machine platen 16, a second machine platen 18, a first mold plate 20, a mold block 22 that has a second mold plate 24 thereon, a takeout structure 26, a takeout structure drive mechanism 28 and four tie bars 30. In another embodiment (not shown), the injection molding machine 10 does not have tie-bars, especially for smaller injection pressures and also for applications that require robots movable between the first mold plate 20 and the second mold plate 24.

The injection unit 14 may have any suitable makeup and may include a barrel 32 and a screw (not shown) as is known in the art.

The injection unit 14 is coupled with the first machine platen 16. The first machine platen is stationary.

The first mold plate 20 is mounted in association with the first machine platen 16 and includes a hot runner system having a plurality of hot runner nozzles (not specifically shown herein but which may be any suitable hot runner system and nozzles known in the art) and a plurality of female mold cavity halves 34.

The mold block 22 is positioned between the first machine platen 16 and the second machine platen 18. The mold block 22 in the embodiment shown in FIG. 1 may be referred to as a mold cube 22 and has four sides. However, it will be appreciated that the mold block 22 can have any other suitable number of sides, such as three, five, six (as shown in FIG. 5) or eight sides, with one side having injection mold cores thereon, and with a plurality of other sides having cooling cores or other features. Increasing the number of the block sides/faces permits additional cooling steps to be performed to further reduce the injection molding cycle time or to cool bigger or thicker preforms that need more cooling time. Also, by increasing the number of sides/faces additional or different operations can take place after removing the PET preforms from the injection mold.

In one embodiment of the invention shown in FIG. 1 the mold cube 22 has first, second and third and fourth sides or facets 36, 38, 40 and 42. The first and second sides 36 and 38 have projections 44 and 46 extending therefrom respectively. On the first side 36 there is the second mold plate 24 and the projections 44 are male or core injection molding cavity portions (and are thus manufactured to relatively strict tolerances). The projections 44 may also be referred to as injection molding cores. The first side 36 may be referred to as an injection side 36, since it is on this side that molten plastic is injected into the mold cavities shown at 51 in FIG. 1.

Figure 1A:
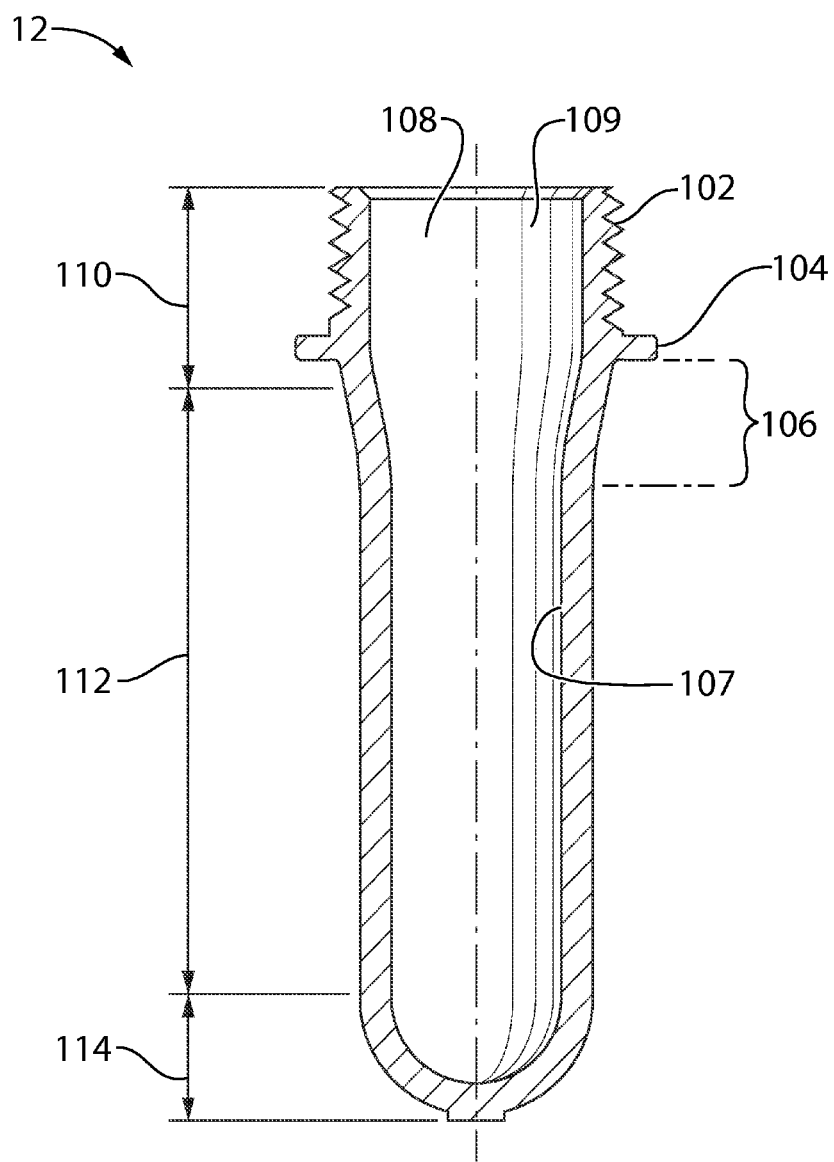
FIG. 1a shows an example of a hollow part that can be molded on the injection molding machine shown in FIG. 1.

An example of a preform 12 (or more broadly, a hollow part 12) that may be molded in the mold cavities 51 is shown in FIG. 1a. The preform 12 includes a body 112, a neck portion 110 which has a thread 102 and a neck ring 104 thereon, and a dome portion 114, which makes up a blind end of the preform 12. The dome portion may also be referred to as an end portion 114 and need not be domed. There is also a transition region 106 under the neck ring 104 that transitions from the neck portion 110 into the body 112. The preform 12 has an interior 108, an opening to the interior shown at 109, and an interior surface 107.

In some embodiments, the cores 44 (i.e. the projections on the first side 36 of the mold cube 22) may be configured to blow air into the preforms 12 or may be configured to be liquid cooled and contact the interior surface of the preforms 12 to help cool them. In such instances the injection molding cores 44 may be referred to as injection cooling cores 44.

At the second side 38 there is a first cooling system 48 configured to cool preforms 12 and wherein the projections 46 on the second side are a plurality of cooling cores or cooling pins sized to fit within the molded preforms 12 to assist with cooling the preforms 12 from inside.

Figure 6A:
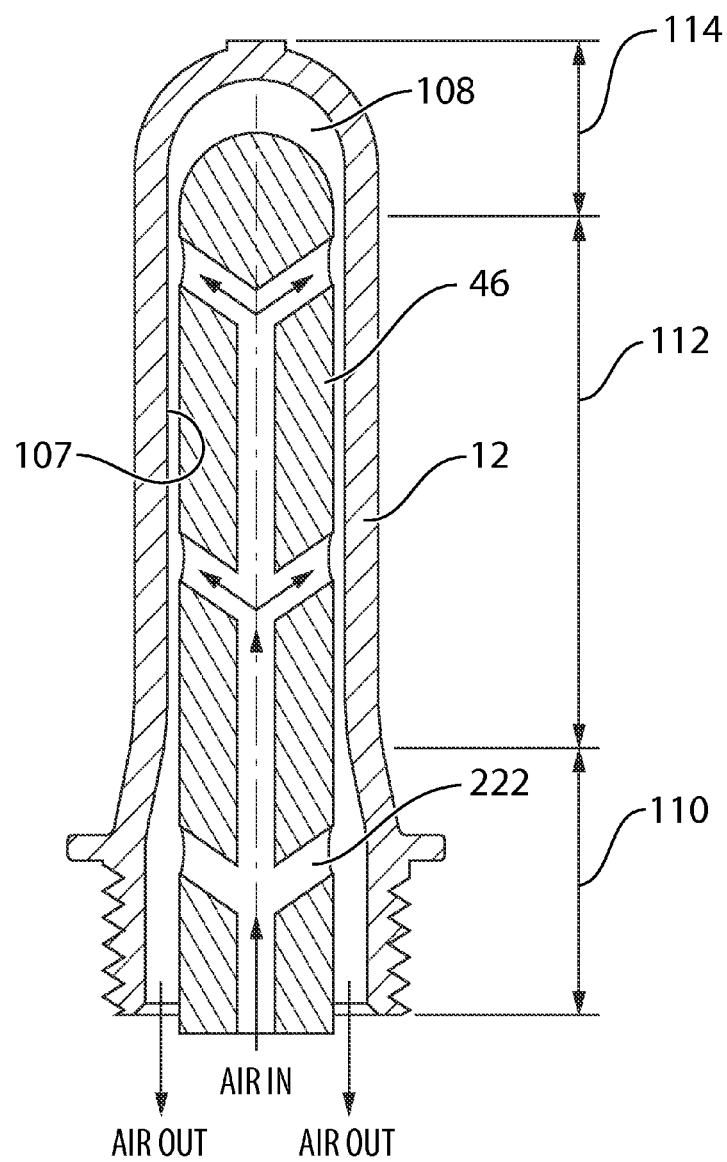
FIGS. 6a and 6b are magnified sectional views of different examples of cooling cores inserted into preforms.
Figure 6B:
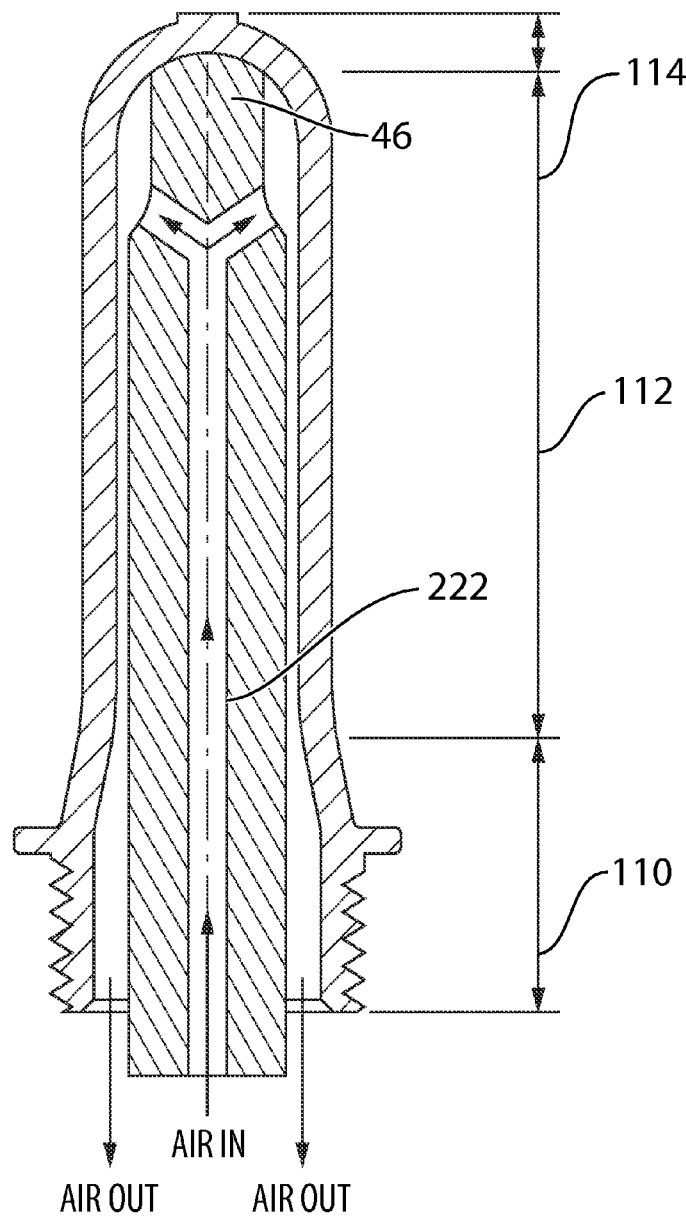

The cooling cores 46 may make full contact with the inside surface 107 of the preforms 12 or, as shown in FIG. 6b, the cooling cores 46 may make partial contact with the interior surface 107. For example, as shown in FIG. 6b, the cooling cores 46 may make contact with the interior surface 107 only at the dome portion 114. In another embodiment shown in FIG. 6a, the cooling cores 46 may enter into the interior volume of the preform 12, but may avoid direct contact with the interior surface 107. Cooling channels 222 are shown in the cooling core 46 in FIG. 6a and in the cooling core 46 shown in FIG. 6b.

In some embodiments, when the preforms 12 are on the second side 38 of the mold cube 22, the molded preforms 12 may be cooled only via their interiors 108 inside by the cooling cores 46 aside from the cooling at the neck portion 110 by the neck ring mold portions 60. In other embodiments, such as shown in FIG. 1, the first cooling system 48 may include a cooling plate 49 that is movable towards and away the second side 38 and that has cavities 51 therein to surround the exterior of the bodies 112 of the preforms 12 to help cool them preforms 12. Cooling fluid (e.g. water) may flow through cooling channels in the cooling plate 49. Alternatively the cooling plate 49 may be replaced by any suitable structure such as an air jet assembly for blowing air over the preforms to help cool them. In some embodiments, the cooling cores 46 may be omitted, and cooling of the preforms may take place through the neck ring mold portions 60 and optionally on the exterior of the preforms 12 via an air jet, via the cooling plate 49, or via any other suitable means. The second side 38 may be referred to as the first cooling side or as the first post-mold cooling side because it is the first side where the preforms 12 are cooled after leaving the side where the mold cavities 51 are located. This is to differentiate the second side 38 from the first side 36 where some cooling of the preforms 12 may also take place.

As can be seen in FIGS. 6a and 6b, each cooling core 46 need not contact all parts of the interior surface 107 of each preform 12. Thus there may be a gap between some or all of each cooling core 46 and the associated interior surface 107. As a result, it can be seen that the cooling cores 46 do not require the tight tolerances that the injection molding cores 44 require since the cores 46 do not form part of the mold cavities 51. This greatly reduces the cost of manufacture of the cooling cores 46 relative to the injection molding cores 44.

At the third side 40 there is a second cooling system 50 that may be similar to the first cooling system 48. The third side 40 has projections 47 extending therefrom which may be similar to the cooling cores 46. The third side 40 may be referred to as a second cooling side, or a second post-mold cooling side.

At the fourth side 42 of the mold cube 22 there is a preform transport system 52 for receiving and transporting molded, cooled preforms 12 (shown in dotted outline) away from the injection molding and cooling apparatus 10. The preform transport system may be any suitable type of system. The preforms may be deposited into individual receptacles in a tray, or alternatively, they may be dumped on a conveyor. Alternatively any other transport system may be used. The fourth side 42 may be referred to as a part transfer side.

The takeout structure 26 is rotatably mounted relative to the mold cube 22. First, second, third and fourth neck ring plates 54, 56, 58 and 59 are movably mounted to the takeout structure 26 for linear movement towards and away from the sides of the mold cube 22. Each neck ring plate has thereon a plurality of sets of neck ring mold portions 60 thereon. Only the neck ring plate 54 is shown in FIG. 1 with the mold portions 60 however all the neck ring plates 54, 56, 58, 59 have the mold portions 60. In some embodiments of the invention the neck ring mold portions 60 contain cooling channels for the transport of cooling fluid for cooling the necks of preforms captured by the neck ring mold portions 60 during the injection molding process. In some embodiments of the invention, the neck ring plates 54, 56 and 58 adjacent the first, second and third sides 36, 38 and 40 of the mold cube 22 are movable between a first position in which the neck ring plates hold first and second pluralities of preforms 12 on the projections 44, 46 that extend from the first and second sides 36 and 38 of the mold cube 22, a second position wherein the neck ring plates 54 and 56 hold the first and second pluralities of the preforms 12 away from the projections 44, 46 on the first and second sides 36 and 38 of the mold cube. wherein the neck ring plate adjacent the third side of the mold cube 22 is movable between a first position wherein the neck ring mold portions capture necks of the preforms, and a second position wherein the neck ring mold portions separate to release the necks of the preforms 12 so as to release the preforms to the preform transport system.

Figure 2A:
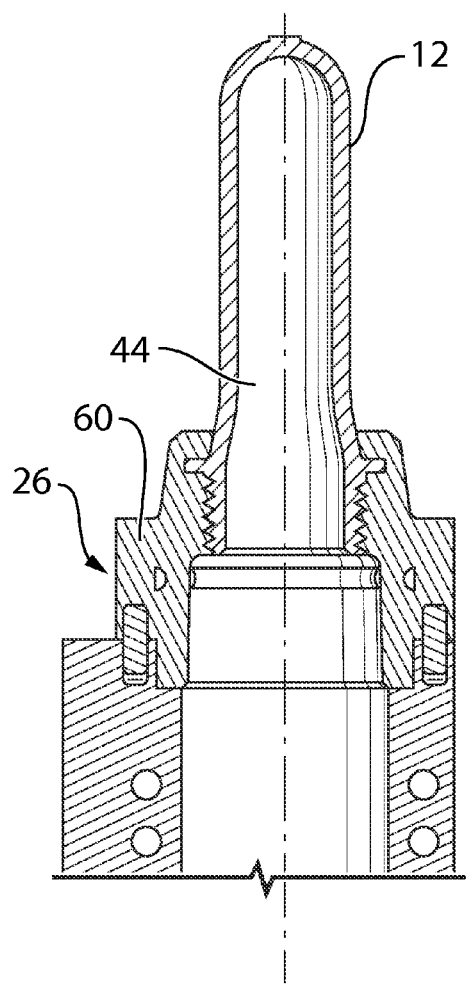
FIGS. 2a and 2b are magnified side views illustrating the removal of a preform after being cooled on an injection cooling cores.
Figure 2B:
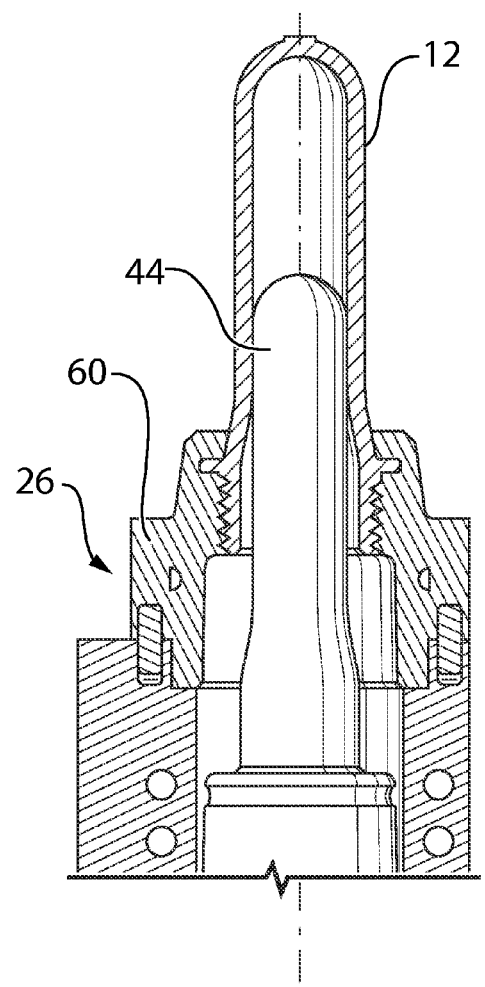

FIGS. 2a and 2b are magnified sectional side views of the preform 12, illustrating the removal of a preform 12 by the takeout structure 26 after the injection step and the in-mold cooling step on the injection cooling cores 44. After this step the preforms 12, which are retained in the neck ring mold portions 60 are rotated by the takeout structure 26 to the first post-mold cooling side while the mold block 22 is stationary.

The takeout structure drive mechanism 28 is coupled to the takeout structure 26 and is operable to rotate the takeout structure 26 relative to the mold cube 22 between a plurality of positions including a first position wherein the first, second, third and fourth neck ring plates 54, 56, 58 and 59 face the first, second, third and fourth sides 36, 38, 40 and 42 of the mold cube 22 respectively, a second position wherein the first, second, third and fourth neck ring plates 54, 56, 58 and 59 face the second, third, fourth and first sides 38, 40, 42 and 36 of the mold cube 22 respectively, a third position wherein the first, second, third and fourth neck ring plates 54, 56, 58 and 59 face the third, fourth, first and second sides 40, 42, 36 and 38 of the mold cube 22 respectively and a fourth position wherein the first, second, third and fourth neck ring plates 54, 56, 58 and 59 face the fourth, first, second and third sides 42, 36, 38 and 40 of the mold cube 22 respectively. The drive mechanism 28 may be any suitable type of drive mechanism such as an electric motor, a hydraulic motor or any other mechanism.

A neck ring plate drive mechanism (not shown) is coupled to the neck ring plates to drive the neck ring plates between the first and second positions. This drive mechanism may be achieved by any suitable means such an electric or hydraulic motor or any other suitable means. It will be understood by one skilled in the art how to provide such a neck ring plate drive mechanism.

The mold cube 22 and the takeout structure 26 are together movable linearly relative to the first mold plate 20 between a first position wherein the second mold plate 24, the neck ring mold portions 60 and the first mold plate 20 together form a plurality of mold cavities 51 (FIG. 1), and a second position wherein the mold cube 22 is spaced from the first mold plate 20, thereby permitting the linear drive mechanism to move the neck ring plates 54, 56, 58 and 59 (and therefore the neck ring mold portions 60) from the first position to the second position.

The mold cube 22 is movable by any suitable means between the first and second positions.

The machine 10 is shown in the open position in FIG. 1. To mold the preforms 12 the mold cube 22 is brought into engagement with the first mold plate 20 and plastic is injected into the mold cavities 51. The second platen is brought towards the mold cube 22 as the mold cube 22 is brought into engagement with the first mold plate 20. The plastic is cooled and the cavities 51 are opened.

The neck ring plates still hold the preforms 12 via the neck ring mold portions 60 which continue to be cooled. The takeout structure is rotated so that the neck ring plates proximate the mold plates are rotated to the first cooling system. The neck ring plates are brought inwardly towards the mold cube 22 so that the cores 46 insert into the preforms 12 and the cooling plates 49 is brought into proximity or engagement with the preforms and the preforms are further cooled. The neck ring mold portions 60 continue to cool the neck portions 110 of the preforms 12. The cooling plate 49 is retracted (if necessary) and the neck ring plates are moved away from the cores 46. The takeout structure is rotated again so that the preforms are brought to the second cooling system. The neck ring plates are brought inwardly again and further cooling of the preforms takes place. The neck ring mold portions continue to cool the necks of the preforms. The neck ring plates are moved outwards again and the takeout structure is rotated again so that the preforms are adjacent the transport system. The neck ring plates are moved outwards again. The neck ring plate on the side of the mold cube with the transport system opens the neck ring mold portions as it moves (e.g. via a roller/cam system) so that the neck rings (and thus the preforms) are released to the transport system. It will be noted that the preforms on all the sides of the mold cube are molded/cooled/released and that the neck portions of the preforms are cooled throughout. The neck ring portion of the preform is the thickest and needs more time to cool and has the thread and the thread can be deformed if the preform is cooled outside the mold in cooling tubes. In the present system 10 the preform is retained on the neck ring mold portions during the molding and two cooling cycles. This means that the present system can better preserve the shape of the preforms' necks. Also in some applications it may be desired to make the neck portion crystalline and to do this a heater can be added close to the neck ring to cool the neck slower than the rest of the preform.

It will be noted that the mold cube does not rotate during this cycle. It moves linearly towards and away from the first mold plate. Only the takeout structure rotates, which consumes less energy.

Figure 5A:
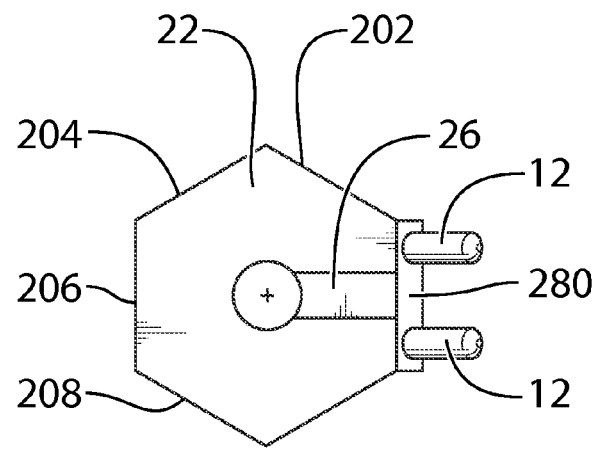
FIGS. 5a-5f show the movement of a portion of the takeout structure about sides of a six sided mold block.
Figure 5B:
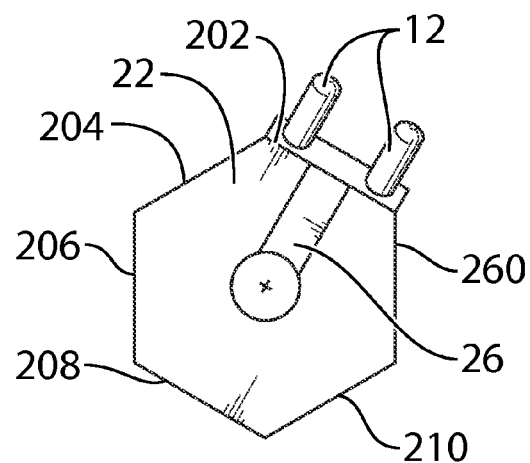
Figure 5C:
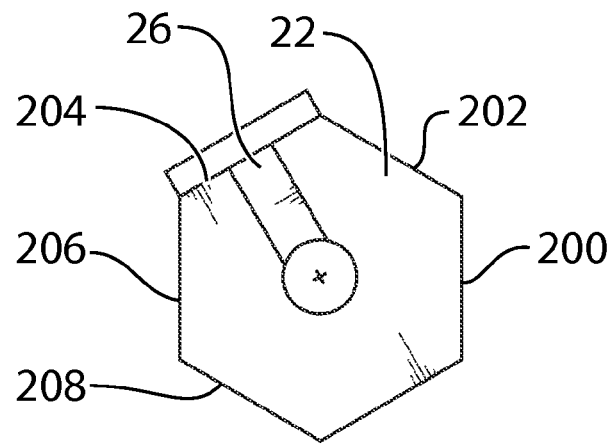
Figure 5D:
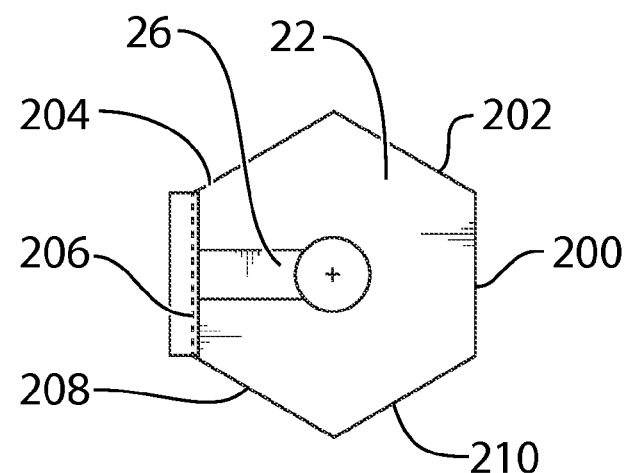
Figure 5E:
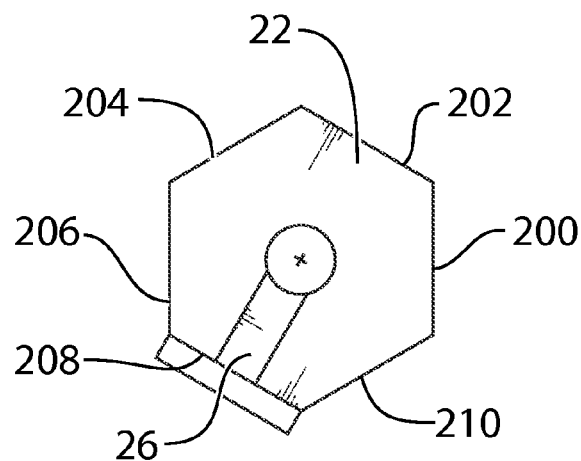
Figure 5F:
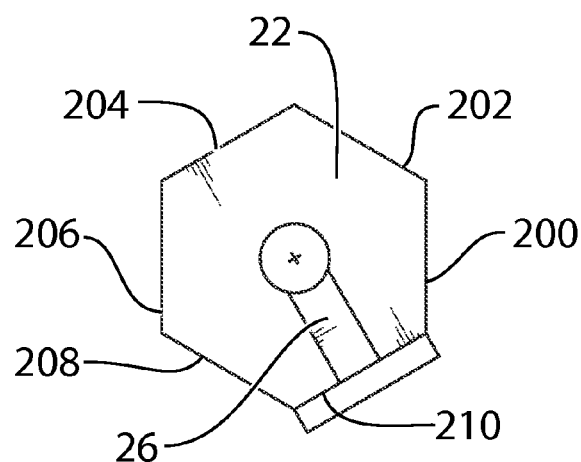

In some embodiments the middle movable mold section (the mold cube) that has a single mold side with cavities and rotate the arms carrying molded preforms towards cooling stations. At the cooling stations the present system retracts the preforms for internal cooling using cooling pins located on the cube. In some cases the present system don't cool the preforms from outside just passive cooling in the surrounding atmosphere. If the preforms are thicker the present system blows air at these sections similar to U.S. Pat. No. 5,728,409. If the preforms are even thicker the present system can bring air cavities over the preforms and cool by contact or more closer and focused air blow. The preform cooling stations are at 90 degrees to one another. In one embodiment (shown) the middle cube is squeezed between the two machine platens. It is possible to eliminate the movable machine platen and slide the cube that will have also a clamping mechanism, similar to U.S. Pat. No. 5,728,409 the contents of which are incorporated herein in their entirety. As shown in FIGS. 5a-5f, the mold block 22 can be generally hexagonal, having six sides, shown at 200, 202, 204, 206, 208 and 210 respectively. The side 200 may be similar to the side 36 of the mold block 22 shown in FIG. 1 and may thus be the injection side. The sides 202, 204, 206 and 208 may be first, second, third and fourth post-mold cooling sides and may each be similar to the sides 38 or 40 of the mold block 22 shown in FIG. 1. The side 210 may be a part transfer side and may be similar to the side 42 shown in FIG. 1. With the mold block 22 shown in FIGS. 5a-5f, the preform 12 may undergo four stages of cooling after leaving the mold cavities 51. Only one arm of the takeout structure 26 is shown in FIGS. 5a-5f so as to illustrate its rotation about the axis. Additionally, for simplicity, the preforms 12 shown in FIGS. 5a and 5b are omitted from FIGS. 5c-5f, but it will be understood that they would be present on the mold block 22 in FIGS. 5c-5e and would be shown as ejected from the mold block 22 in FIG. 5f. An advantage to the mold block 22 shown in FIGS. 5a-5f is that it may reduce the size and length of the arms of the takeout structure 26.

The above-described embodiments of the invention are intended to be examples of the present invention and alterations and modifications may be effected thereto, by those of skill in the art, without departing from the scope of the invention which is defined solely by the claims appended hereto.

Figure 3A:
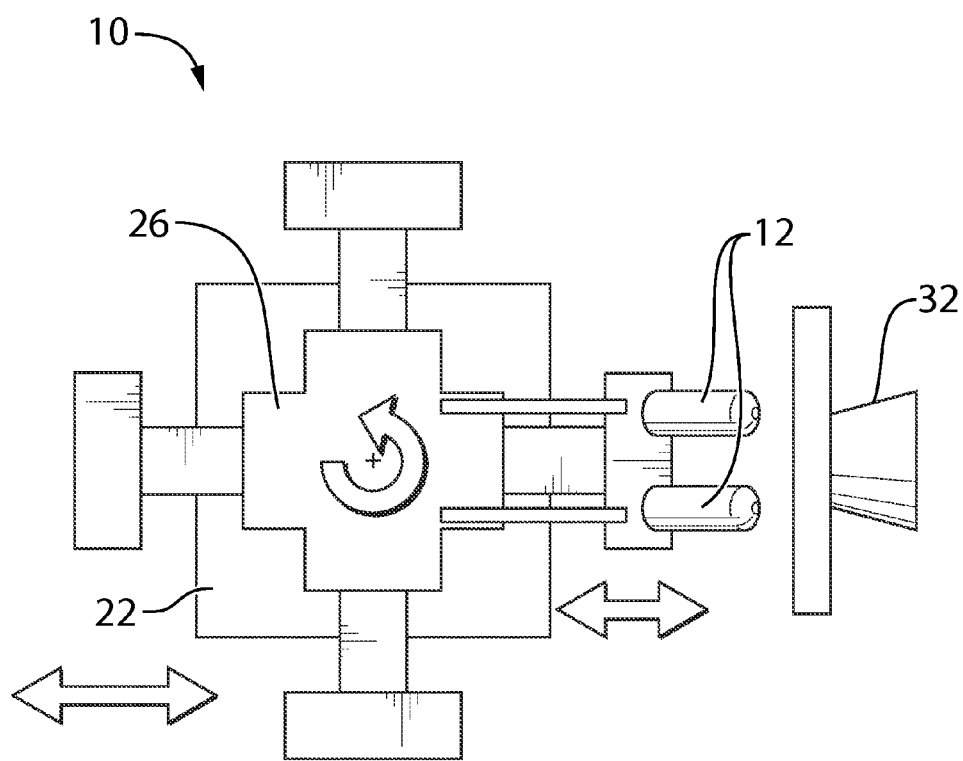
FIGS. 3A-B-C-D-E show various embodiments where the preforms retained on the neck portion by the neck rings of the mold are moved by rotations and translations towards cooling stations, or in-mold label attachment on the preform, or to a blow mold station matching the pitch of the injection molding station, or to a 2nd injection station where a second material or the same material in injected over the 1st injected material.
Figure 3B:
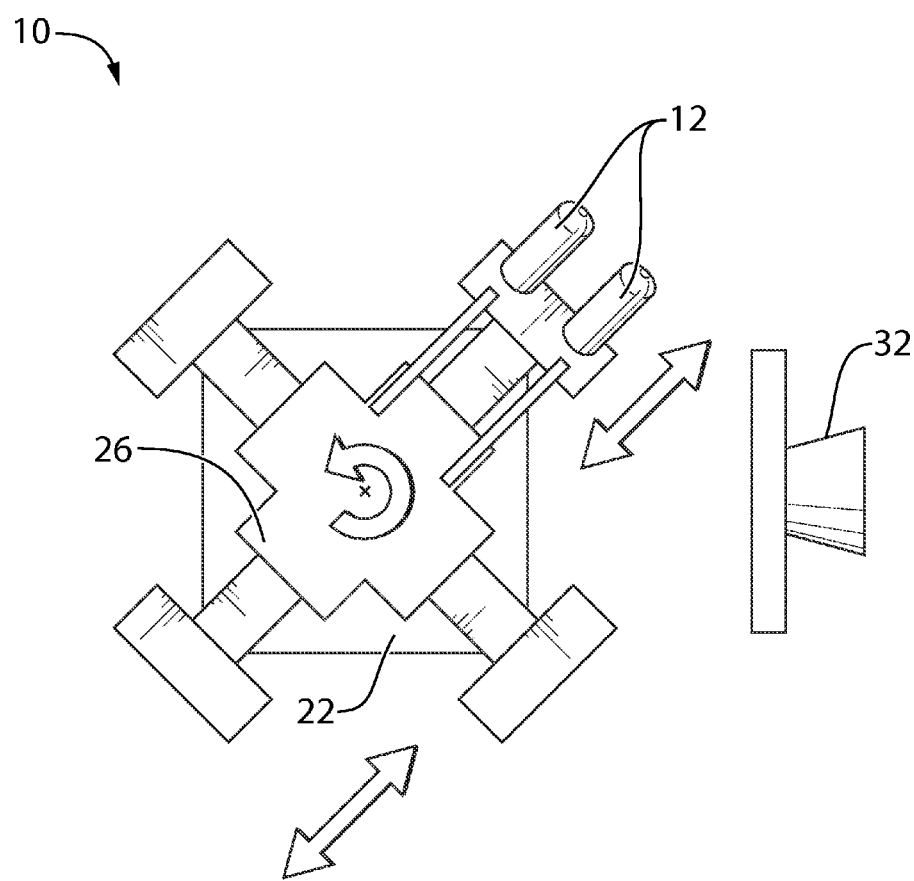
Figure 3C:
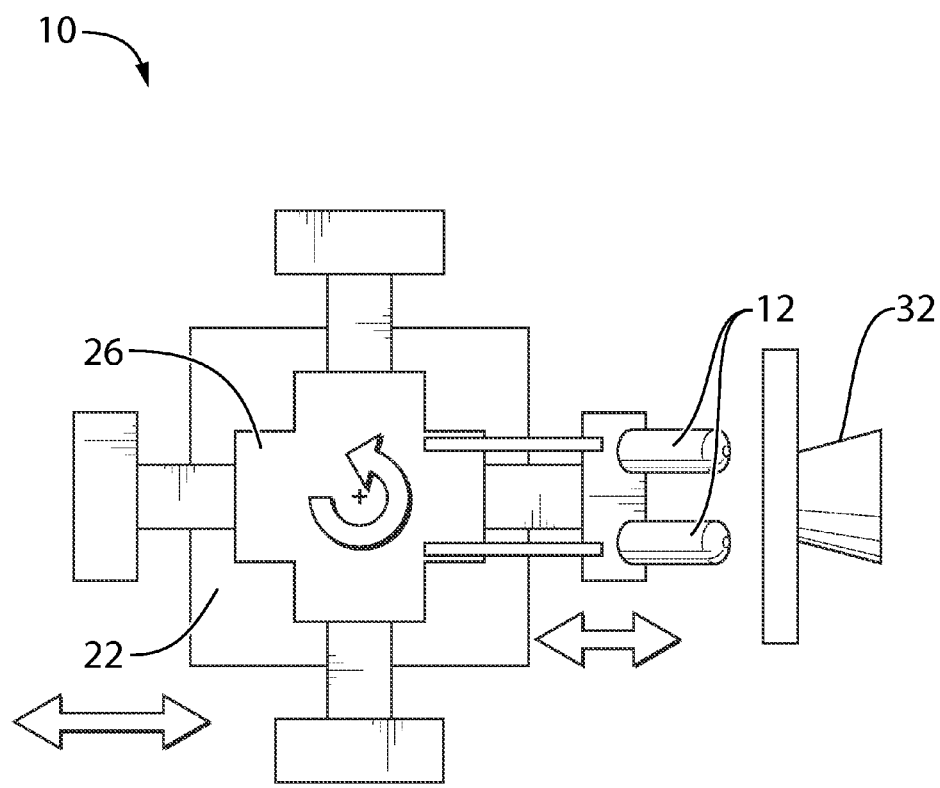
Figure 3D:
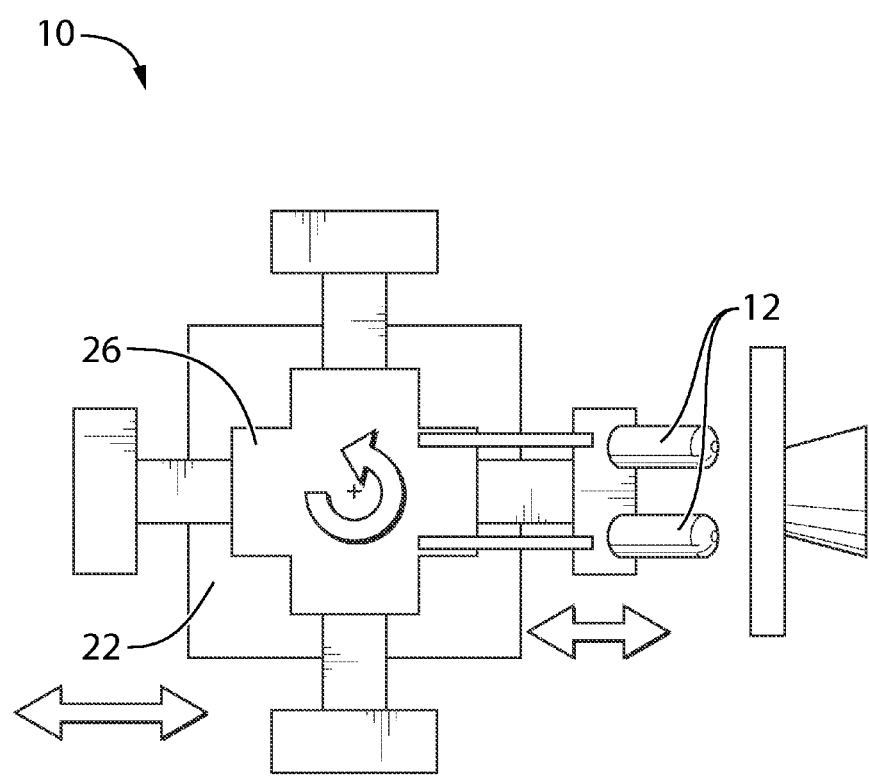
Figure 3E:
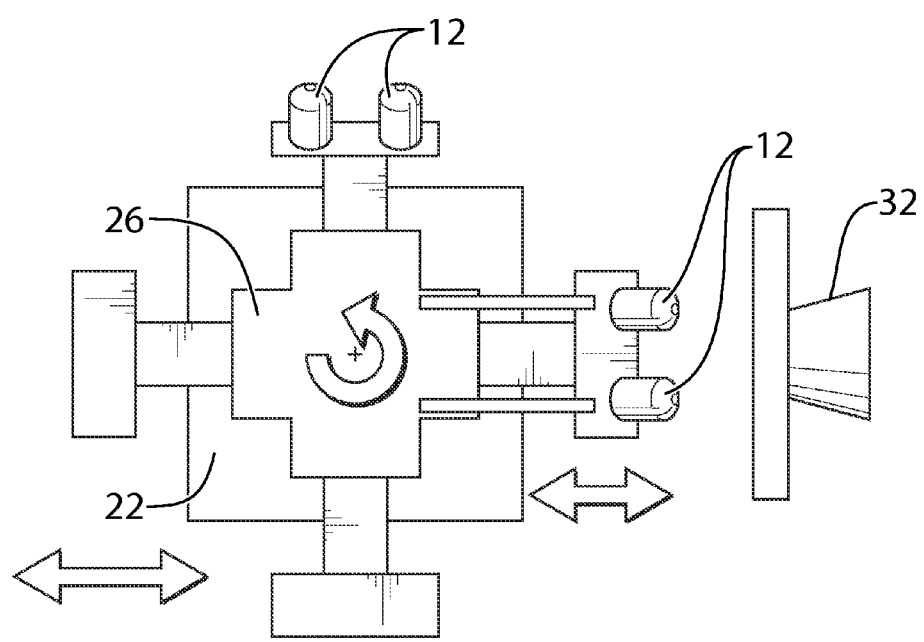

FIGS. 3A-B-C-D-E show various embodiments where the preforms with their neck portions 110 retained by the neck ring mold portions 60 of the machine 10 and which are moved by rotations and translations towards cooling stations, or in-mold label attachment on the preform, or to a blow mold station matching the pitch of the injection molding station, or to a second injection station where a second material or the same material in injected over the first injected material, or to any other suitable type of station for any suitable operation.

Figure 4A:
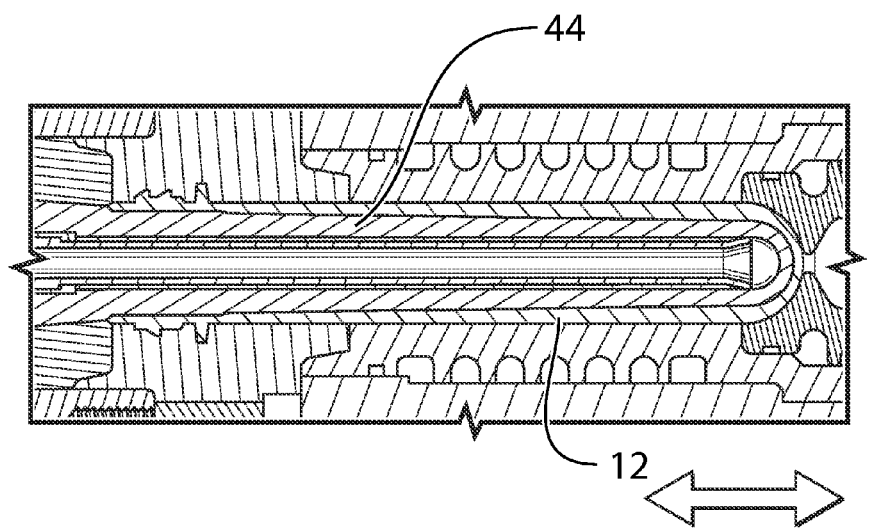
FIGS. 4A-B-C-D show the injection step, the removal of the preform from the core with the preform retained on the neck ring portions of the mold and in FIG. 4C the cooling station with an internal cooling pin and in some cases the cooling cavity to cool the exterior of the preform. In the last step and station the preforms are removed from the preform transport device by separating the neck rings of the mold.
Figure 4B:
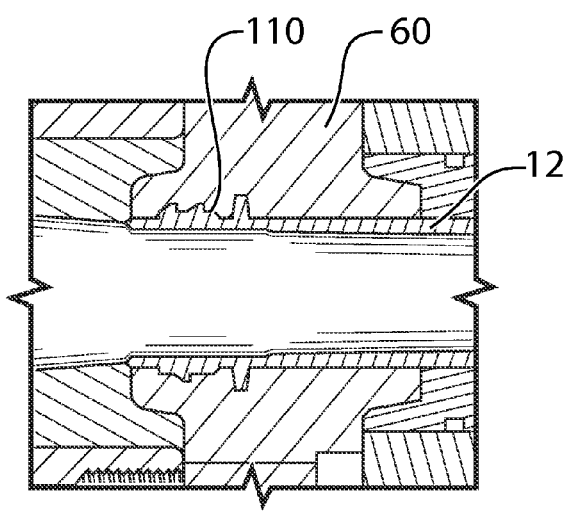
Figure 4C:
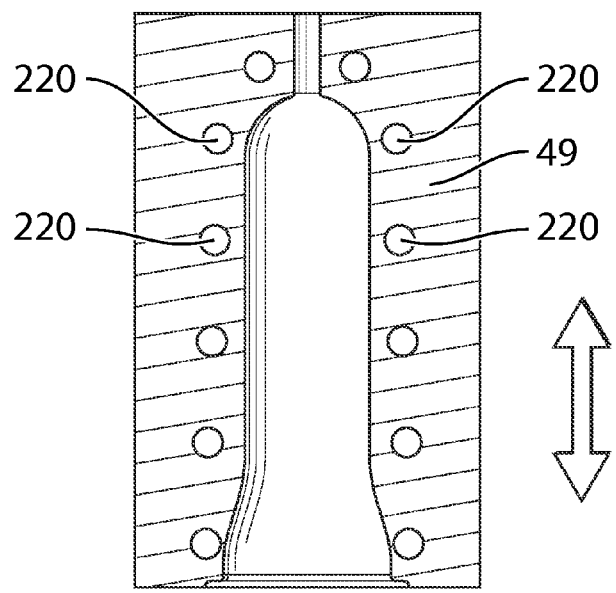
Figure 4C:
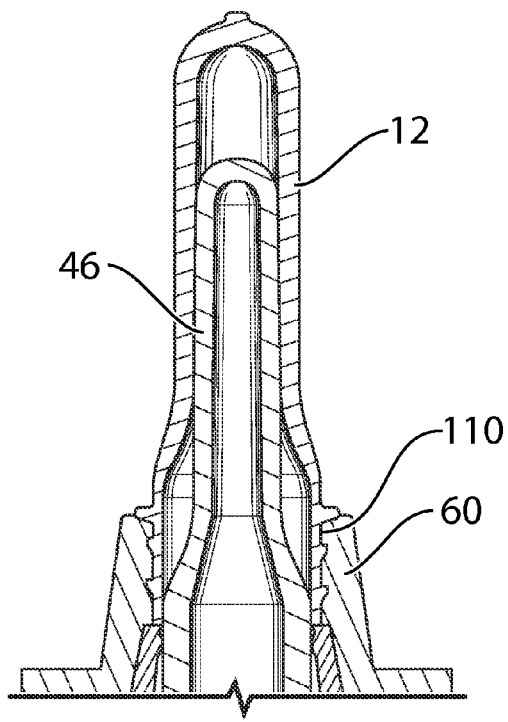
Figure 4D:
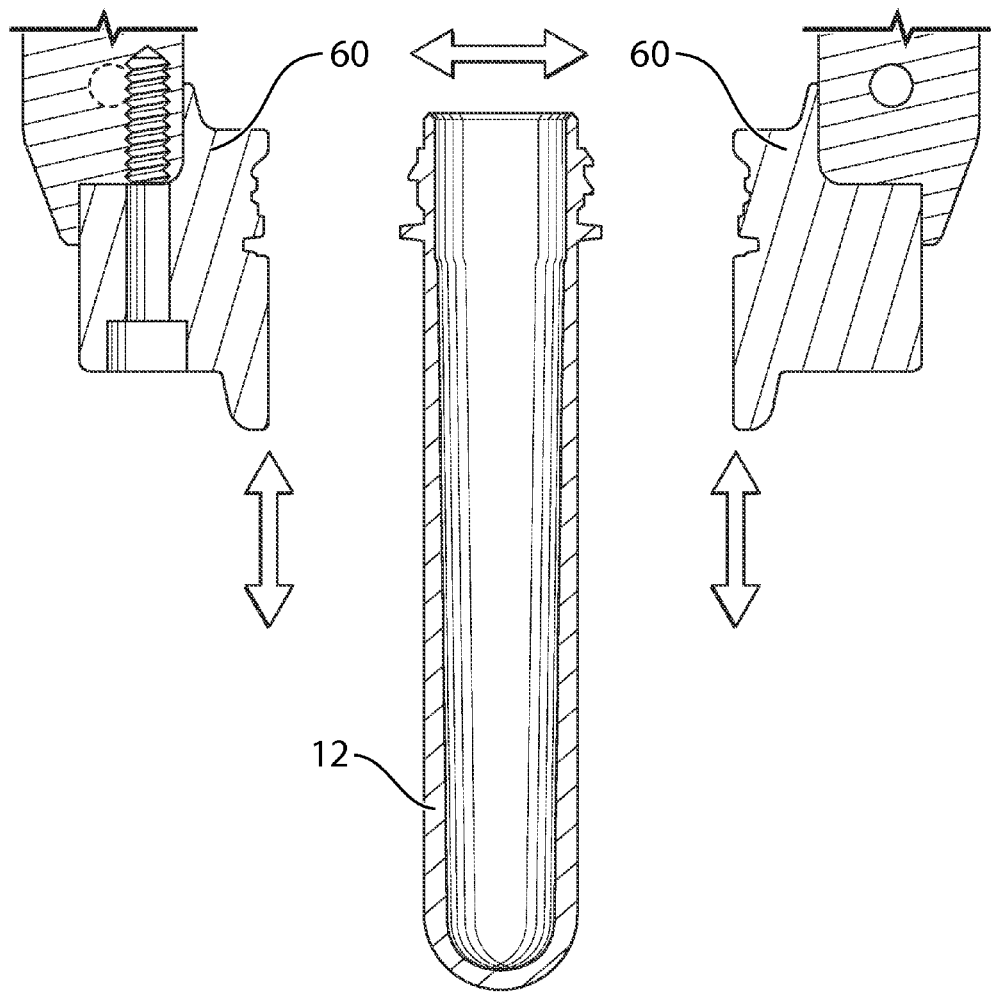

FIGS. 4A-B-C-D show the injection step, the removal of the preform from the injection molding core with the neck portion 110 of the preform 12 retained by the neck ring mold portions, and in FIG. 4C the cooling station with an internal cooling pin and in some cases the cooling plate 49 (that includes, for example, cooling channels 220 for transporting coolant) to cool the exterior of the preform. In the last station the preforms 12 are removed takeout structure by separating the neck ring mold portions 60.

Figure 7B:
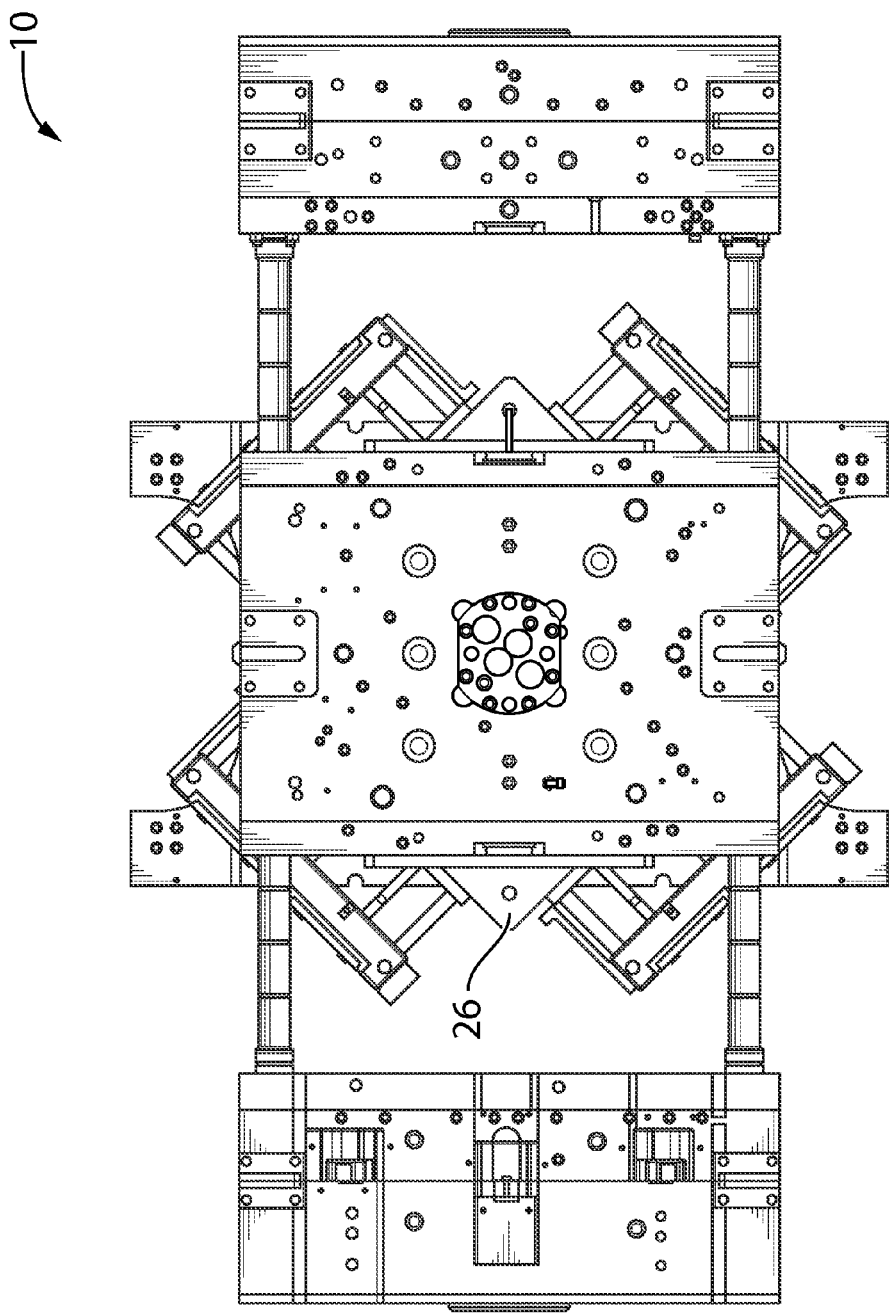
FIGS. 7A-B-C-D show isometric view of the movable block and the rotary supports of the preforms with neck rings. The preforms and the two cooling stations are not show here. There are two designs where the rotary support can rotate for some applications parallel to the machine base so that the preforms are ejected on a natural vertical position sometimes on movable boxes that may contain additional cooling.
Figure 7C:
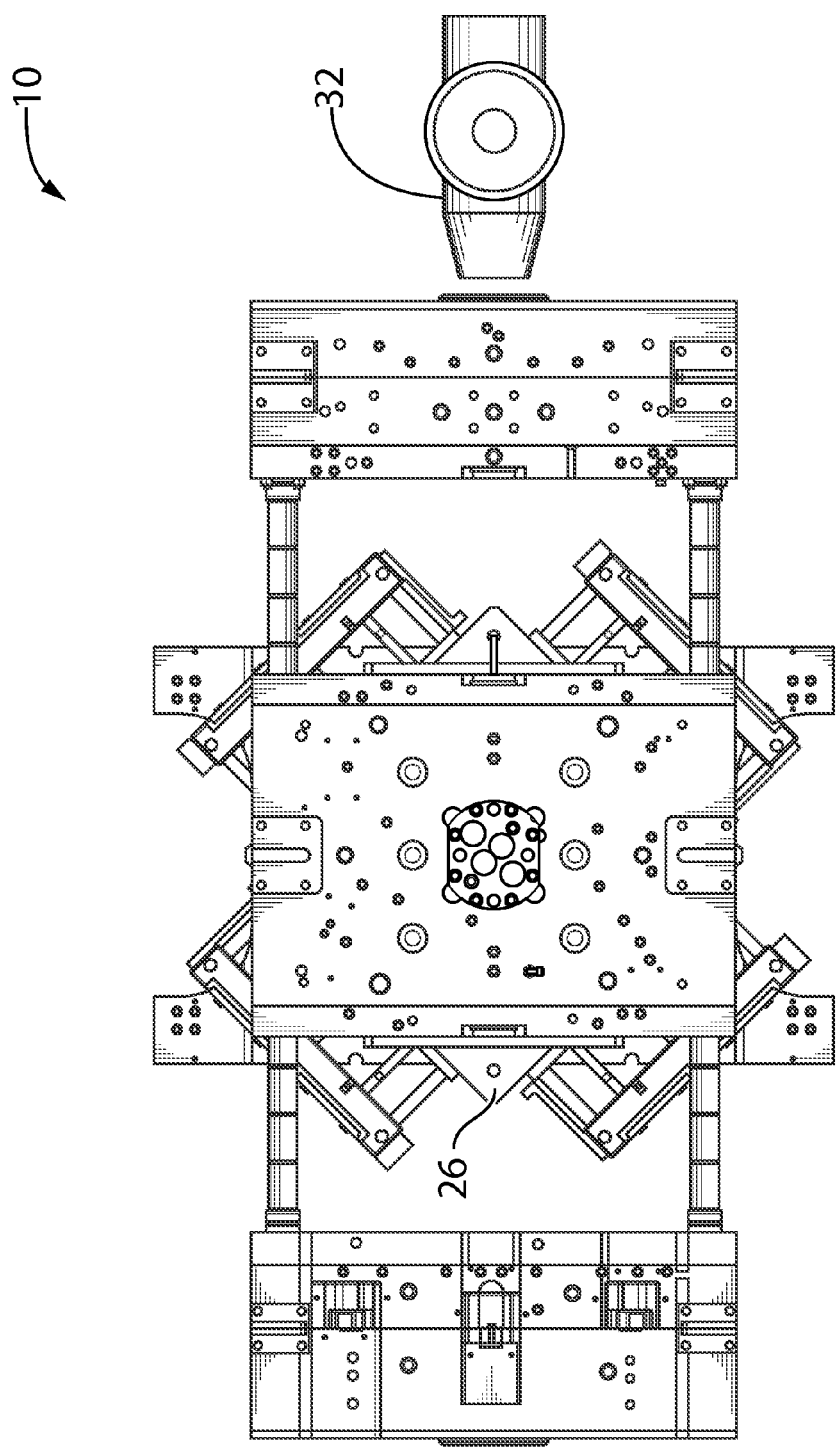
Figure 7D:
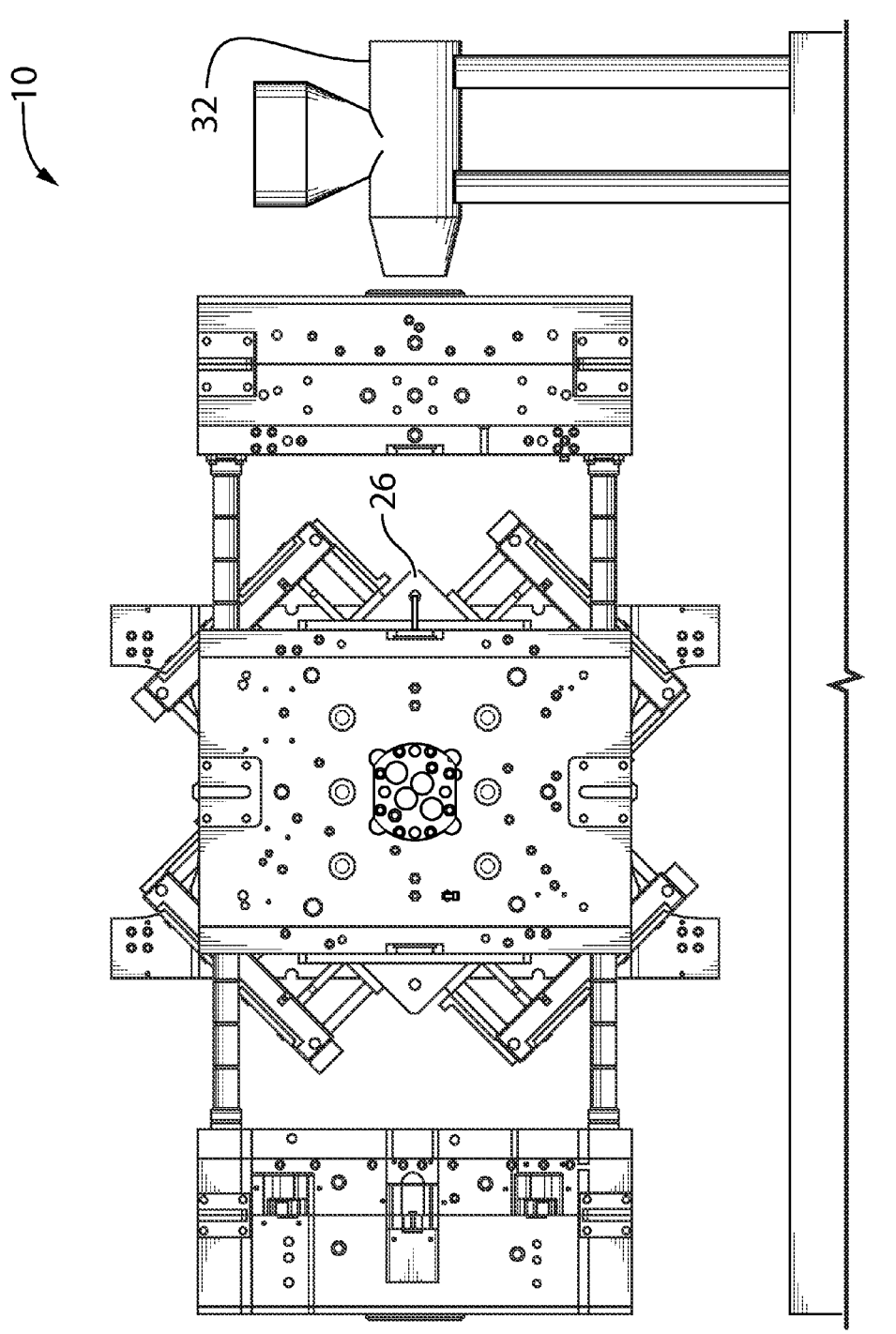
Figure 8A:
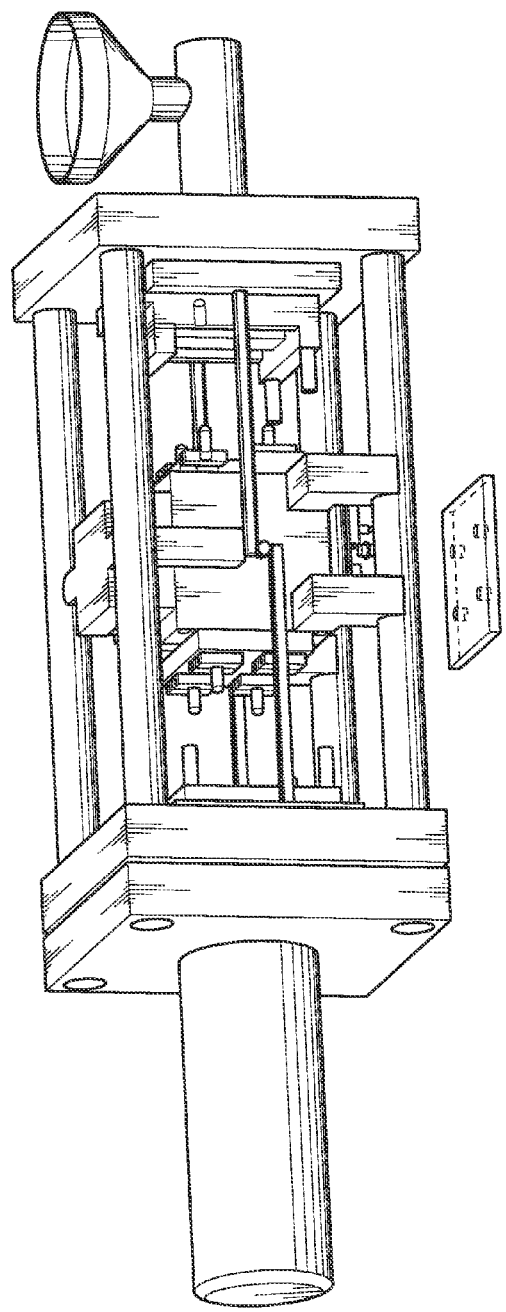
FIGS. 8a-8d show other views of an injection molding machine through stages of injection and cooling and part transfer.
Figure 8B:
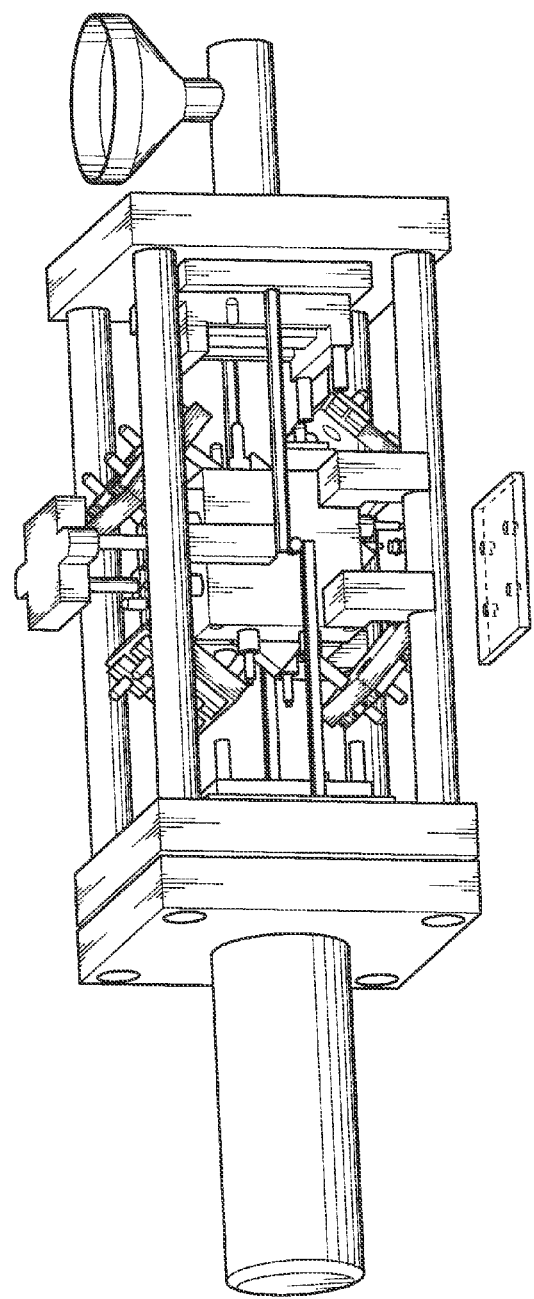
Figure 8C:
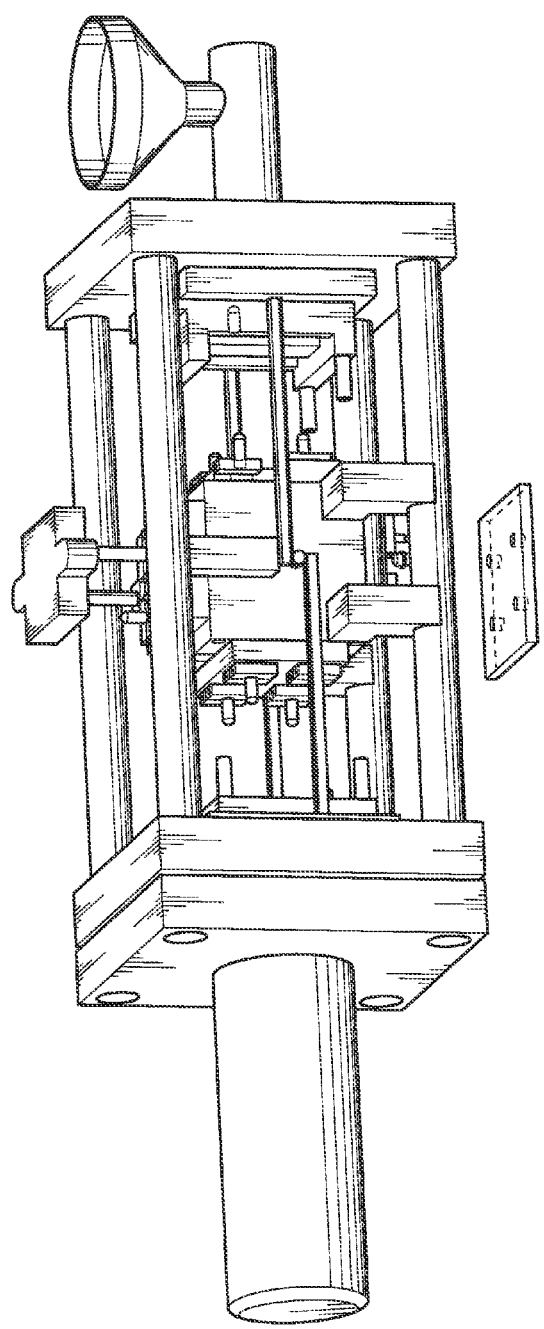
Figure 8D:
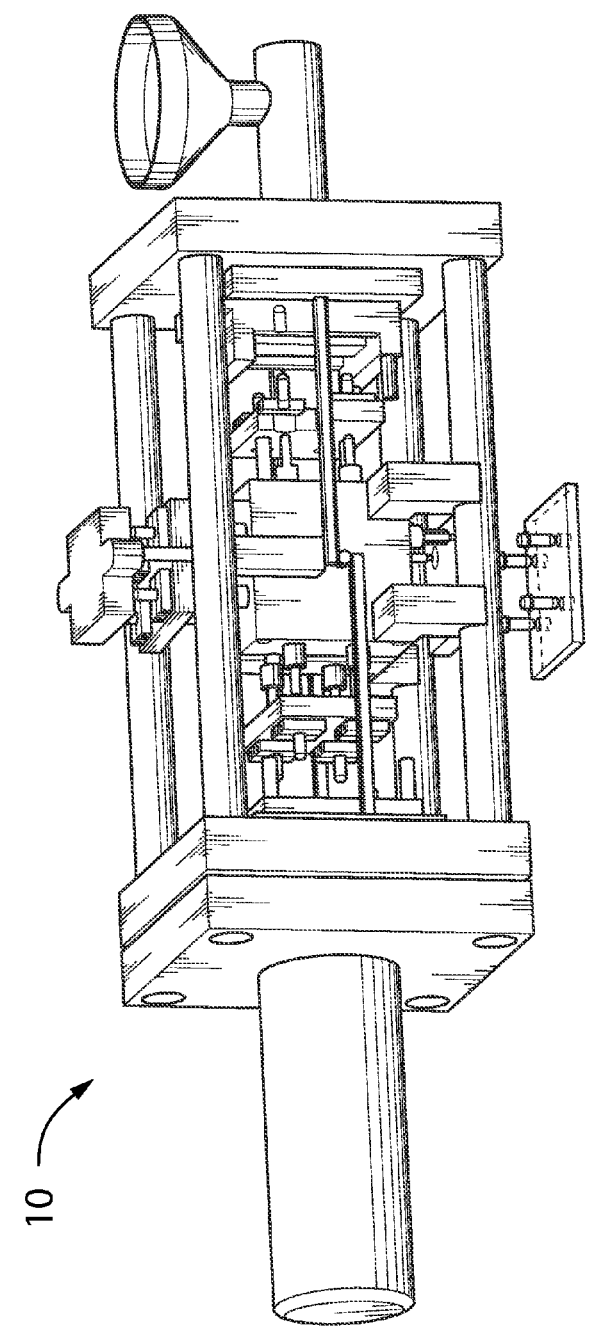

FIGS. 7A-B-C-D show isometric views of the movable block and the rotary supports of the preforms with neck rings. The preforms and the two cooling stations are not show here. There are two designs where the rotary support can rotate for some applications parallel to the machine base so that the preforms are ejected on a natural vertical position sometimes on movable boxes that may contain additional cooling.

FIGS. 8a-8d show other views of an injection molding machine 10 through stages of injection and cooling and part transfer.

Figure 9:
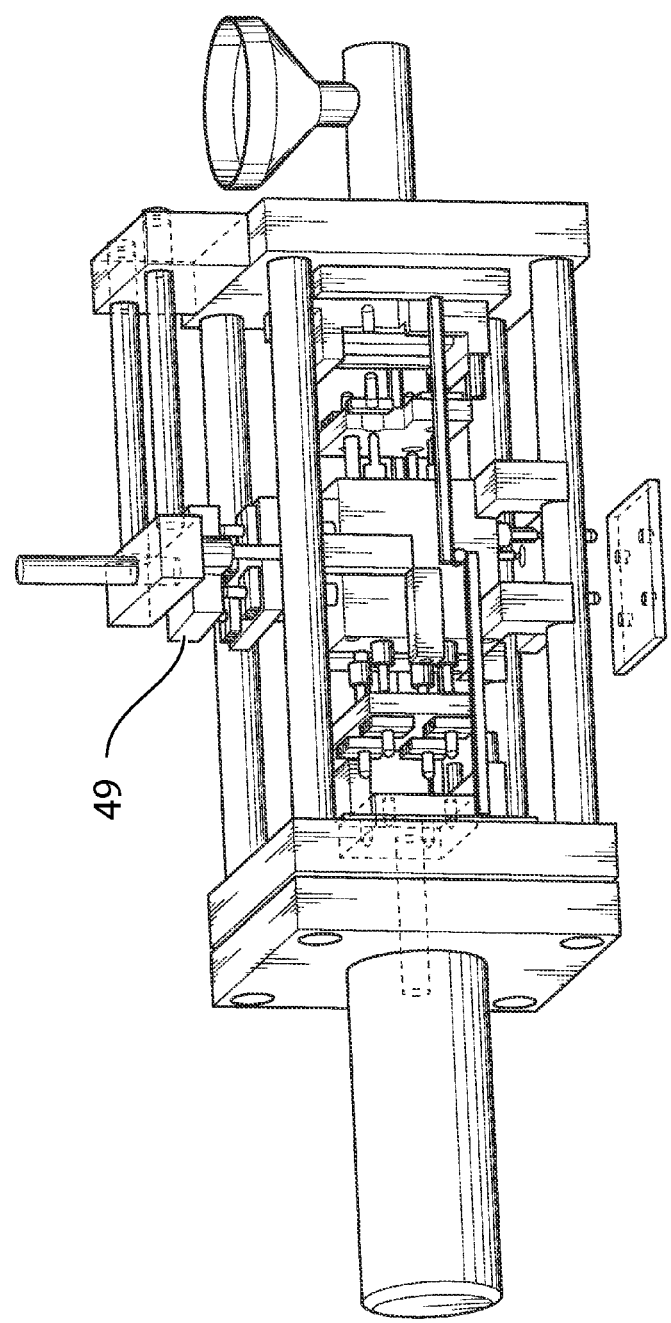
FIG. 9 shows an injection molding machine where the cooling plate is mounted to the frame of the injection molding machine and not to the mold block.

FIG. 9 shows a machine 10 where the cooling plate 29 is mounted to the frame of the machine 10 and not to the mold block.

Those skilled in the art will understand that a variety of other modifications may be effected to the embodiments described herein without departing from the scope of the appended claims.

The invention claimed is:

1. An injection molding and cooling apparatus for molding and cooling plastic bottle preforms, comprising:
   an injection unit;
   a first machine platen;
   a second machine platen;
   a first mold plate mounted in association with the first machine platen and including a hot runner system having a plurality of hot runner nozzles and a plurality of female mold cavity halves;
   a mold block located between the first machine platen and the second machine platen, wherein the mold block has first, second and third sides, each of the first and second sides having projections extending therefrom, wherein on the first side there is a second mold plate and the projections are male mold cavity halves, wherein on the second side there is a cooling system configured to cool preforms and wherein the projections on the second side are a plurality of cores sized to fit within molded preforms to assist with cooling the preforms, and wherein adjacent the third side of the mold block is a preform transport system for receiving and transporting molded, cooled preforms away from the injection molding and cooling apparatus;
   a takeout structure rotatably mounted relative to the mold block, wherein first, second and third neck ring plates are movably mounted to the takeout structure for movement towards and away from the sides of the mold block, wherein each neck ring plate has thereon a plurality of sets of neck ring mold portions, wherein the neck ring mold portions contain cooling channels for the transport of cooling fluid for cooling necks of preforms captured by the neck ring mold portions,
   wherein the neck ring plates adjacent the first and second sides of the mold block are movable between a first position in which the neck ring plates hold first and second pluralities of preforms on the projections that extend from the first and second sides of the mold block, and a second position wherein the neck ring plates hold the first and second pluralities of the preforms away from the projections on the first and second sides of the mold block, wherein the neck ring plate adjacent the third side of the mold block is movable between a first position wherein the neck ring mold portions capture necks of the preforms, and a second position wherein the neck ring mold portions separate to release the necks of the preforms so as to release the preforms to the preform transport system;
   a takeout structure drive mechanism that is coupled to the takeout structure and is operable to rotate the takeout structure relative to the mold block between a plurality of positions including a first position wherein the first, second and third neck ring plates face the first second and third sides of the mold block respectively, a second position wherein the first, second and third neck ring plates face the second, third and first sides of the mold block respectively and a third position wherein the first, second and third neck ring plates face the third, first and second sides of the mold block respectively;

a neck ring plate drive mechanism that is coupled to the neck ring plates to drive the neck ring plates between the first and second positions, wherein the mold block and the takeout structure are together movable linearly relative to the first mold plate between a first position wherein the second mold plate, the neck ring mold portions and the first mold plate together form a plurality of mold cavities, and a second position wherein the mold block is spaced from the first mold plate, thereby permitting the linear drive mechanism to move from the neck ring plates from the first position to the second position; and a ram configured to drive the mold block between the first and second positions.

2. An injection molding and cooling apparatus as claimed in claim 1, wherein the mold block has a fourth side located between the second and third sides having projections extending therefrom which are cores sized to fit within the preforms to assist with cooling the preforms, and wherein on the fourth side there is a second cooling system configured to cool preforms, wherein a fourth neck ring plate is movably mounted to the takeout structure for movement towards and away from the sides of the mold block and has thereon a plurality of sets of neck ring mold portions thereon containing cooling channels for the transport of cooling fluid for cooling necks of preforms captured by the neck ring mold portions, wherein the neck ring plate adjacent the fourth side of the mold block is movable between a first position in which the neck ring plate holds a plurality of preforms on the projections that extend from the fourth side, and a second position wherein the neck ring plates hold the first and second pluralities of the preforms away from the projections on the fourth side, and wherein the second platen and the mold block are movable relative to the first mold plate and wherein the second platen is movable linearly relative to the mold block between a first position wherein a portion of the second cooling system is brought into proximity of preforms captured by the neck ring plate adjacent the fourth side and a second position wherein the portion of the second cooling system is brought away from preforms captured by the neck ring plate adjacent the fourth side.

* * * * *